US008926837B1

(12) United States Patent
Shumate

(10) Patent No.: US 8,926,837 B1
(45) Date of Patent: Jan. 6, 2015

(54) PORTABLE COOKING OIL FILTERING SYSTEM

(71) Applicant: Eldridge J. Shumate, Louisville, KY (US)

(72) Inventor: Eldridge J. Shumate, Louisville, KY (US)

( * ) Notice: Subject to any disclaimer, the term of this patent is extended or adjusted under 35 U.S.C. 154(b) by 0 days.

(21) Appl. No.: 14/230,271

(22) Filed: Mar. 31, 2014

Related U.S. Application Data

(60) Provisional application No. 61/921,866, filed on Dec. 30, 2013.

(51) Int. Cl.
*A47J 37/12* (2006.01)
*B01D 36/00* (2006.01)
*B01D 33/00* (2006.01)

(52) U.S. Cl.
USPC .......... 210/167.28; 210/196; 210/360.1; 210/416.5; 210/424; 210/DIG. 8; 99/408

(58) Field of Classification Search
None
See application file for complete search history.

(56) References Cited

U.S. PATENT DOCUMENTS

| | | | | | |
|---|---|---|---|---|---|
| 3,100,747 | A | * | 8/1963 | Hall | 210/167.28 |
| 3,279,605 | A | * | 10/1966 | Shepherd | 210/110 |
| 3,356,218 | A | * | 12/1967 | Grudoski | 210/167.28 |
| 3,630,361 | A | * | 12/1971 | Keating | 210/85 |
| 3,685,433 | A | * | 8/1972 | Cunningham | 99/408 |
| 3,750,560 | A | * | 8/1973 | Holmes | 99/408 |
| 4,519,904 | A | * | 5/1985 | Helmick | 210/167.28 |
| 4,702,827 | A | * | 10/1987 | Wenzel | 210/117 |
| 5,010,805 | A | * | 4/1991 | Ferrara | 99/353 |
| 5,317,964 | A | * | 6/1994 | Prudhomme | 99/495 |
| 5,330,638 | A | * | 7/1994 | Burklund et al. | 210/108 |
| 5,340,471 | A | * | 8/1994 | Wilson et al. | 210/167.28 |
| 5,354,455 | A | * | 10/1994 | Burklund et al. | 210/104 |
| 5,439,601 | A | * | 8/1995 | Burklund et al. | 210/798 |
| 5,449,469 | A | * | 9/1995 | Burklund et al. | 210/798 |
| 5,487,907 | A | * | 1/1996 | Drown et al. | 426/417 |
| 5,490,453 | A | * | 2/1996 | Mackay | 99/495 |
| 5,611,265 | A | * | 3/1997 | Ronci et al. | 99/353 |
| 5,954,071 | A | * | 9/1999 | Magliocca | 134/109 |
| 6,068,707 | A | * | 5/2000 | Magliocca | 134/10 |
| 6,168,723 | B1 | * | 1/2001 | Moody | 210/774 |
| 6,306,221 | B1 | * | 10/2001 | Magliocca | 134/10 |
| 6,398,877 | B1 | * | 6/2002 | Magliocca | 134/10 |
| 6,783,685 | B2 | * | 8/2004 | Hwang | 210/690 |

(Continued)

OTHER PUBLICATIONS

Kitchen Restaurant Supply, search results for "oil filters" on web site, available at http://www.kitchenrestaurantsupply.com/search.cfm/store/rwkey=oil%20filters/ (downloaded Jul. 2, 2014).

(Continued)

*Primary Examiner* — Robert James Popovics
(74) *Attorney, Agent, or Firm* — Stites & Harbison, PLLC; David W. Nagle, Jr.

(57) ABSTRACT

A portable cooking oil filtering system comprises: a cart; a supply tank mounted on the cart; a pump mounted on the cart and configured to deliver cooking oil from a fryer to the supply tank; a centrifuge filter mounted on the cart and in fluid communication with the supply tank, such that the centrifuge filter receives the cooking oil from the supply tank, and then separates waste from the cooking oil; a sludge tank mounted on the cart and configured to receive the waste from the centrifuge filter; and a filtered oil tank mounted on the cart and configured to receive the cooking oil from the centrifuge filter.

8 Claims, 3 Drawing Sheets

(56) References Cited

U.S. PATENT DOCUMENTS

| | | | |
|---|---|---|---|
| 7,846,259 B2 * | 12/2010 | Magliocca | 134/10 |
| 7,938,959 B1 * | 5/2011 | Inman et al. | 210/167.28 |
| 8,037,892 B2 * | 10/2011 | Magliocca | 134/111 |
| 8,153,001 B2 * | 4/2012 | Peters | 210/232 |
| 8,268,179 B2 * | 9/2012 | Peters | 210/767 |
| 2006/0091050 A1 * | 5/2006 | Hwang | 210/167 |
| 2008/0237104 A1 * | 10/2008 | Foster et al. | 210/167.28 |
| 2008/0277325 A1 * | 11/2008 | Marheine | 210/167.28 |
| 2009/0038643 A1 * | 2/2009 | Magliocca | 134/17 |
| 2009/0044706 A1 * | 2/2009 | Foster et al. | 99/336 |
| 2009/0321333 A1 * | 12/2009 | Magliocca | 210/167.28 |
| 2010/0037782 A1 * | 2/2010 | Foster et al. | 99/337 |
| 2010/0206179 A1 * | 8/2010 | Foster et al. | 99/407 |
| 2010/0258109 A1 * | 10/2010 | Foster et al. | 126/299 E |
| 2011/0036378 A1 * | 2/2011 | Magliocca | 134/110 |
| 2011/0061545 A1 * | 3/2011 | Foster et al. | 99/407 |
| 2011/0062091 A1 * | 3/2011 | Peters | 210/808 |
| 2012/0193304 A1 * | 8/2012 | Peters | 210/767 |
| 2013/0008320 A1 * | 1/2013 | Kilmer | 99/408 |
| 2013/0341258 A1 * | 12/2013 | Sekora | 210/167.28 |

OTHER PUBLICATIONS alibaba.com, Chongqing Lushun Scientific & Technological Development Co., Ltd., product information for Self-Cleaning Alfa Laval oil purifier, Centrifuge LXJ, available at http://lushuntec.en.alibaba.com/product/943641192-218570374/Self_Cleaning_Alfa_Laval_oil_purifier_Centrifuge_LXJ.html (downloaded Jul. 2, 2014).

Restaurant Technologies, Inc., "Clean, Safe, Smart Oil Management," product information sheet.

Restaurant Technologies, Inc., "Total Oil Management, Equipment Features" product information sheet.

Restaurant Technologies, Inc., "Filtration Monitoring" product information sheet.

Pitco Frialator, Inc., "Model RP14, RP18 Reversible Pump, Portable Filter System" product information sheet, Rev. 9 (Apr. 2013).

Winston Industries, "Shortening Filters, F Series, Owner's Manual," Rev. 20 (Feb. 26, 2014).

\* cited by examiner

PORTABLE COOKING OIL FILTERING SYSTEM

CROSS-REFERENCE TO RELATED APPLICATIONS

The present application claims priority to U.S. Provisional Patent Application Ser. No. 61/921,866 filed on Dec. 30, 2013, the entire disclosure of which is incorporated herein by reference.

BACKGROUND OF THE INVENTION

In the restaurant industry, there are a relatively few methods for filtering and cleaning cooking oil. Most commonly, the cooking oil is pumped out of the fryer through a hose and is then passed through a filter supported by a screen. The cooking oil passes through the filter into a tank, while the waste is collected by the filter. The cooking oil is then returned to the fryer. To achieve this, the tank for receiving the cooking oil and the pump are often positioned on a cart, which can be moved next to the fryer for the filtering/cleaning process. However, the hot cooking oil is often exposed and presents a safety hazard to the employees in the vicinity of the fryer. Furthermore, in using such a system, the pump may slow as the filter collects waste and may occasionally stop moving the cooking oil. In that case, the filter media paper must then be removed and disposed of by hand, which creates another safety hazard.

In another method for filtering and cleaning cooking oil, the fryer includes a drain valve that is opened to expel the cooking oil through a cone-shaped paper filter supported by a wire mesh screen. The cooking oil passes through the filter into a pot or similar vessel, while the waste is collected by the filter. The cooking oil in the pot must then be poured back into the fryer, which is not only time-consuming, but presents another significant safety hazard.

Finally, in view of the attendant safety hazards, some restaurants do not filter and clean the cooking oil, but rather simply discard and replace the cooking oil when it becomes too dirty.

SUMMARY OF THE INVENTION

The present invention is a portable cooking oil filtering system.

An exemplary cooking oil filtering system made in accordance with the present invention generally comprises a cart or similar mobile framework, with a number of components mounted on the cart, including: a pump; a supply tank; a centrifuge filter; a sludge tank; a filtered oil tank; and the necessary hoses, piping, valves and controls to interconnect and operate such components.

In some embodiments, the cart is comprised of a frame mounted on wheels or a similar means for making the cart portable and mobile. The cart may also include a handle, which allows a user to readily push or pull the cart.

The portable cooking oil filtering system is connected to a fryer by a hose, placing the cooking oil of the fryer in fluid communication with the pump. In some embodiments, an inlet coupling is provided on a front panel of the cart and connects to the hose. The inlet coupling is connected to and in fluid communication with a first valve. The first valve is then connected to and in fluid communication with the pump. When the hose is connected to the inlet coupling, and the first valve is in a first (open) position, the pump can be activated to draw cooking oil through the inlet coupling and the first valve. The cooking oil is then pumped through and out of the pump, and then to a second valve. When the second valve is in a first (open) position, the cooking oil continues through the second valve and is delivered to a supply tank.

The centrifuge filter is then in fluid communication with the supply tank. In some embodiments, a flow control valve is interposed between the supply tank and the centrifuge filter. When the flow control valve is open, the cooking oil is delivered from the supply tank to the centrifuge filter. The centrifuge filter is driven by a motor, and, as it rotates, centrifugal forces separate the waste (i.e., sludge) from the cooking oil. The waste is collected at the outer wall of the centrifuge filter and is periodically scraped or otherwise removed and discharged into the sludge tank via a discharge line.

In some embodiments, the pump is reversible. Accordingly, once a volume of filtered cooking oil is in the filtered oil tank, the pump can be reversed, and with the second valve in a second (open) position, the filtered cooking oil is drawn through the second valve and back through the pump. The filtered cooking oil is discharged from the pump, through the first valve, and then back through the hose to the fryer. Alternatively, if the filtered cooking oil in the filtered oil tank is not sufficiently clean, with the first valve in a second (open) position, the pump is activated, and the filtered cooking oil is drawn through the first valve, is pumped through and out of the pump and through the second valve, and is then delivered to the supply tank for another filtering cycle.

The portable cooking oil filtering system thus allows for efficient filtering and cleaning of cooking oil, but without any of the safety hazards of prior art systems and methods.

DETAILED DESCRIPTION OF THE INVENTION

The present invention is a portable cooking oil filtering system.

Figure 1:
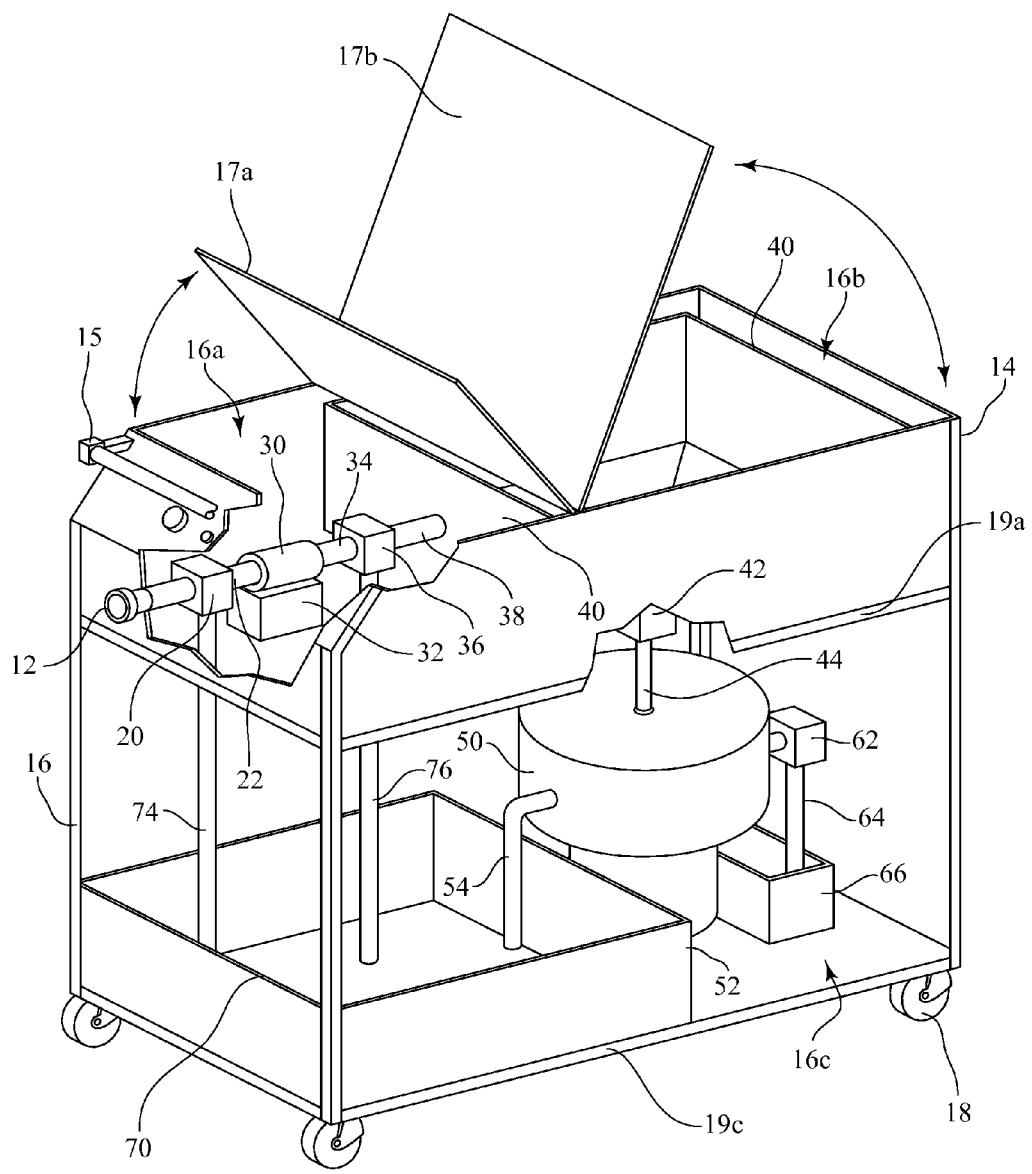
FIG. 1 is a perspective view of an exemplary cooking oil filtering system made in accordance with the present invention.
Figure 2:
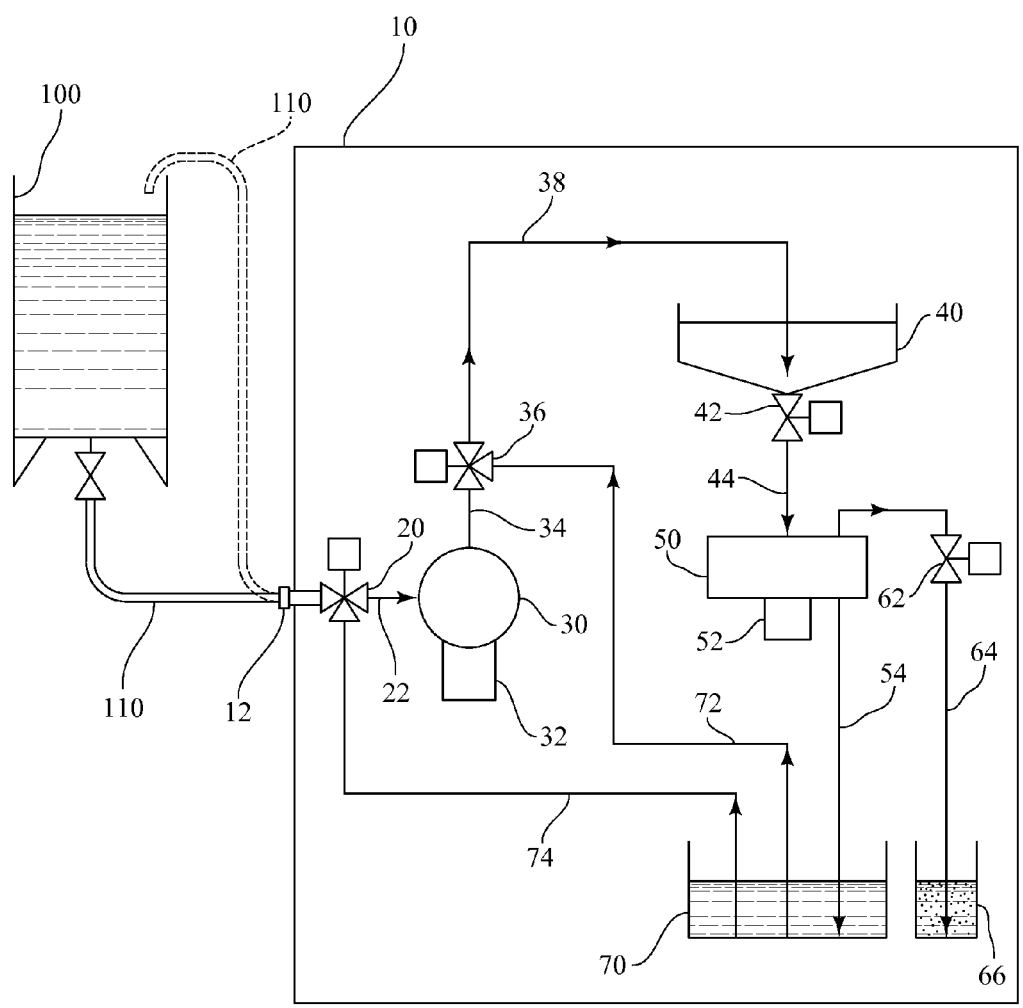
FIG. 2 is a schematic view of the exemplary cooking oil filtering system of FIG. 1.

FIG. 1 is a perspective view of an exemplary cooking oil filtering system 10 made in accordance with the present invention, while FIG. 2 is a schematic view of the portable cooking oil filtering system 10.

Referring first to FIG. 1, the exemplary portable cooking oil filtering system generally comprises a cart 14 or similar mobile framework, with a number of components mounted on the cart, including: a pump 30; a supply tank 40; a centrifuge filter 50; a sludge tank 66; a filtered oil tank 70; and the necessary hoses, piping, valves and controls to interconnect and operate such components, as will be further described below.

Referring still to FIG. 1, the cart 14 is comprised of a frame 16 mounted on wheels 18 or a similar means for making the cart 14 portable and mobile. The cart may also include a handle 15, which allows a user to readily push or pull the cart 14.

Referring still to FIG. 1, in this exemplary embodiment, the frame 16 includes an upper floor panel 19a onto which certain components are mounted (as further described below) and a lower floor panel 19c onto which certain components are mounted (as further described below). Multiple wall panels are also affixed to the frame 16 to enclose the various components within the cart 16. As a result, the frame 16 effectively defines two upper compartments, a front upper compartment 16a and a rear upper compartment 16b, and the frame 16 also defines a lower compartment 16c. In this exemplary embodiment, the cart 14 also includes a door 17a for selectively closing access to the front upper compartment 16a and a door 17b for selectively closing access to the rear upper compartment 16b. Furthermore, in FIG. 1, the lower compartment 16c is illustrated as being open, i.e., there are no wall panels or doors that close access to the lower compartment 16c. Such illustration is primarily to allow the internal components to be viewed and understood, and it is contemplated and preferred that access to the lower compartment 16c would also be closed by some combination of wall panels and/or doors.

Additionally, while not shown in FIG. 1, although the supply tank 40, the sludge tank 66, and the filtered oil tank 70 are each shown as having an open top in FIG. 1, each of these tanks 40, 66, 70 could be provided with a lid or otherwise closed without departing from the spirit and scope of the present invention.

Additionally, while not shown in FIG. 1, each of the sludge tank 66 and/or the filtered oil tank 70 could be mounted on a panel that is configured for sliding movement with respect to the underlying lower floor panel 19c, such that the sludge tank 66 and/or the filtered oil tank 70 could be moved outside of the frame 16 for ready access.

Referring now to FIG. 2, the portable cooking oil filtering system 10 is connected to a fryer 100 by a hose 110, placing the cooking oil of the fryer 100 in fluid communication with the pump 30. In this exemplary embodiment, an inlet coupling 12 is provided on a front panel of the cart 14 and connects to the hose 110. The inlet coupling 12 is connected to and in fluid communication with a first valve 20, which is preferably a three-way solenoid valve, the importance of which will be further described below. The first valve 20 is then connected to and in fluid communication with the pump 30 via a line 22, and the pump 30 is driven by a motor 32. When the hose 110 is connected to this inlet coupling 12, and the first valve 20 is in a first (open) position, the pump 30 can be activated to draw cooking oil through the inlet coupling 12, the first valve 20, and the line 22. The cooking oil is then pumped through and out of the pump 30, and then to a second valve 36 via a line 34. The second valve 36 is also preferably a three-way solenoid valve, the importance of which will be further described below. When the second valve 36 is in a first (open) position, the cooking oil continues through the second valve 36 and is delivered to a supply tank 40 via a line 38. It is contemplated that the supply tank 40 has a sufficient volume to accommodate all of the cooking oil in the fryer 100 (FIG. 1), thus allowing the fryer 100 (FIG. 1) to be cleaned while the cooking oil is stored in the portable cooking oil filtering system 10.

Referring back to FIG. 1, in this exemplary embodiment, the first valve 20, the pump 30 and motor 32, and the second valve 36 are all mounted in the front upper compartment 16a of the cart 14.

Referring again to FIG. 2, the centrifuge filter 50 is then in fluid communication with the supply tank 40. In this exemplary embodiment, a flow control valve 42 is interposed between the supply tank 40 and the centrifuge filter 50. When the flow control valve 42 is open, the cooking oil is delivered via a line 44 into the centrifuge filter 50. The centrifuge filter 50 is driven by a motor 52, and, as it rotates, centrifugal forces separate the waste (i.e., sludge) from the cooking oil. For example, suitable centrifuge filters that could be adapted for use in the portable cooking oil filtering system of the present invention include: a 3450 RPM Oil Centrifuge distributed by Brahma Engineering d/b/a WVO Designs. The waste is collected at the outer wall of the centrifuge filter 50 and is periodically scraped or otherwise removed and discharged into the sludge tank 66 via a discharge line 64. In this exemplary embodiment, and as shown in FIG. 2, the discharge line 64 is provided with a shut-off valve 62 to selectively prevent flow through the discharge line 64. In the meantime, the filtered (or clean) cooking oil is delivered via a line 54 to the filtered oil tank 70.

Referring back to FIG. 1, in this exemplary embodiment, the supply tank 40 is mounted in the rear upper compartment 16b of the cart 14, while the centrifuge filter 50 and the filtered oil tank 70 are mounted in the lower compartment 16c of the cart 14.

Referring again to FIG. 2, in this exemplary embodiment, the pump 30 is preferably reversible. Accordingly, once a volume of filtered cooking oil is in the filtered oil tank 70, the pump 30 can be reversed, and with the second valve 36 in a second (open) position, the filtered cooking oil is drawn through a line 72, through the second valve 36, and back through the pump 30. The filtered cooking oil is discharged from the pump 30 through the line 22 and the first valve 20, and then back through the hose 110 to the fryer 100. In FIG. 2, the hose 110 is shown connected to the drain of the fryer 100; however, as indicated by the dashed lines in FIG. 2, the hose 110 could also be repositioned to deliver the filtered cooking oil to the top of the fryer 100. Alternatively, if the filtered cooking oil in the filtered oil tank 70 is not sufficiently clean, with the first valve 20 in a second (open) position, the pump 30 is activated, and the filtered cooking oil is drawn through a line 74, through the first valve 20, and through the line 22. The cooking oil is then pumped through and out of the pump 30, through the second valve 36 via the line 34, and then delivered to the supply tank 40 via the line 38 for another filtering cycle.

The portable cooking oil filtering system 10 thus allows for efficient filtering and cleaning of cooking oil, but without any of the safety hazards of prior art systems and methods.

As a further refinement, although not shown in FIGS. 1 and 2, it is contemplated that a metal screen or similar filter could be provided in the supply tank 40 to catch larger waste particles before the cooking oil is delivered into the centrifuge filter 50.

As a further refinement, although not shown in FIGS. 1 and 2, it is also contemplated that a catalyst or an anti-oxidant could be introduced into the cooking oil as it moves through the oil filtering system 10, for example, in the supply tank 60, in an effort to extend the life of the cooking oil.

Figure 3:
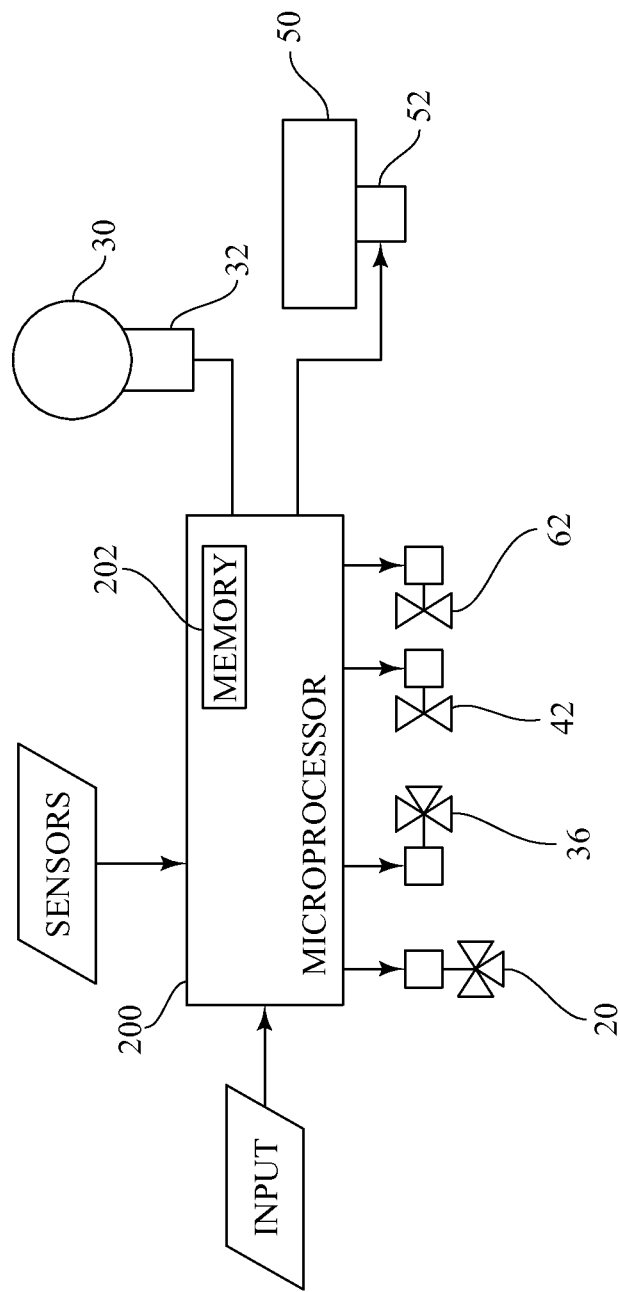
FIG. 3 is a block diagram that illustrates a control logic for the exemplary cooking oil filtering system of FIG. 1.

FIG. 3 is a block diagram that illustrates a control logic for the exemplary cooking oil filtering system 10 of FIG. 1. As shown, such a control logic includes a microprocessor 200 with a memory component 202. Each of the valves 20, 36, 42, 62 is operably connected to and receives control signals from the microprocessor 200. Similarly, the motor 32 for the pump 30 is operably connected to and receives control signals from the microprocessor 200, and the motor 52 for the centrifuge filter 50 is also operably connected to and receives control signals from the microprocessor 200. Accordingly, each of these components could be operated in response to user input. For instance, certain controls could be provided on a front panel of the cart 14 to allow for such user input. Furthermore, preprogrammed routines could be stored in the memory component 202 to further automate the process. For example, the user may simply have to press a button to activate a preprogrammed routine that operates the valves 20, 36, 42, 62 and activates the pump 30 and the centrifuge filter 50 in the proper sequence to filter and clean the cooking oil of a fryer.

Referring still to FIG. 3, it is also contemplated that one or more sensors could be operably connected to the microprocessor 200 to monitor the operation of the cooking oil filtering system. For example, level sensors could be provided in each of the supply tank 40, the sludge tank 66, and the filtered oil tank 70, in order to ensure that none of these tanks 40, 66, 70 are overfilled. If any such level sensor indicated that a measured level exceeded a predetermined limit, the pump 20 or the centrifuge filter 30 could be automatically shut down.

Finally, although a single portable cooking oil filtering system is described above, it should be appreciated that such a single portable cooking oil filtering system could also be part of a larger system in which the portable cooking oil filtering system is not only used to filter and clean cooking oil, but is also used as a means to transport cooking oil, shuttling between multiple fryers, one or more supply tanks of fresh cooking oil, and one or more waste tanks for sludge and/or old cooking oil.

One of ordinary skill in the art will recognize that additional embodiments or implementations are possible without departing from the teachings of the present invention or the scope of the claims which follow. This detailed description, and particularly the specific details of the exemplary embodiment and implementation disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A portable cooking oil filtering system, comprising:
   a cart;
   an inlet coupling connected to and in fluid communication with a first valve;
   a pump mounted on the cart that is connected to and in fluid communication with the first valve, such that, when the first valve is in an open position, the pump receives cooking oil via the inlet coupling;
   a supply tank mounted on the cart;
   a second valve interposed between and in fluid communication with both the pump and the supply tank, such that, when the second valve is in an open position, the cooking oil is delivered from the pump, through the second valve, and to the supply tank;
   a centrifuge filter mounted on the cart;
   a flow control valve interposed between and in fluid communication with both the supply tank and the centrifuge filter, such that, when the flow control valve is in an open position, the cooking coil is delivered from the supply tank to the centrifuge filter, with the centrifuge filter then separating waste from the cooking oil;
   a sludge tank mounted on the cart and configured to receive the waste from the centrifuge filter; and
   a filtered oil tank mounted on the cart and configured to receive the cooking oil from the centrifuge filter.

2. The portable cooking oil filtering system as recited in claim 1, wherein the pump is reversible, such that, with the second valve in an alternate open position, the cooking oil is drawn through a line from the filtered oil tank, through the second valve, back though the pump and the first valve, and then discharged through the inlet coupling.

3. The portable cooking oil filtering system as recited in claim 1, wherein the pump is reversible, such that, with the first valve in an alternate open position, the cooking oil is drawn through a line from the filtered oil tank, through the first valve and returned to the pump, and then delivered to the supply tank.

4. The portable cooking oil filtering system as recited in claim 1, wherein the cart includes a frame that defines a front upper compartment, a rear upper compartment, and a lower compartment.

5. The portable cooking oil filtering system as recited in claim 4, and further comprising at least one door for selectively closing access to the front upper compartment and at least one door for selectively closing access to the rear upper compartment.

6. The portable cooking oil filtering system as recited in claim 4, wherein the pump is mounted in the front upper compartment of the cart.

7. The portable cooking oil filtering system as recited in claim 4, wherein the supply tank is mounted in the rear upper compartment of the cart.

8. The portable cooking oil filtering system as recited in claim 4, wherein the centrifuge filter and the filtered oil tank are mounted in the lower compartment of the cart.

* * * * *